Feb. 24, 1953     J. P. MONTGOMERY ET AL     2,629,846
DRIVE CONTROL SYSTEM
Filed Nov. 18, 1949
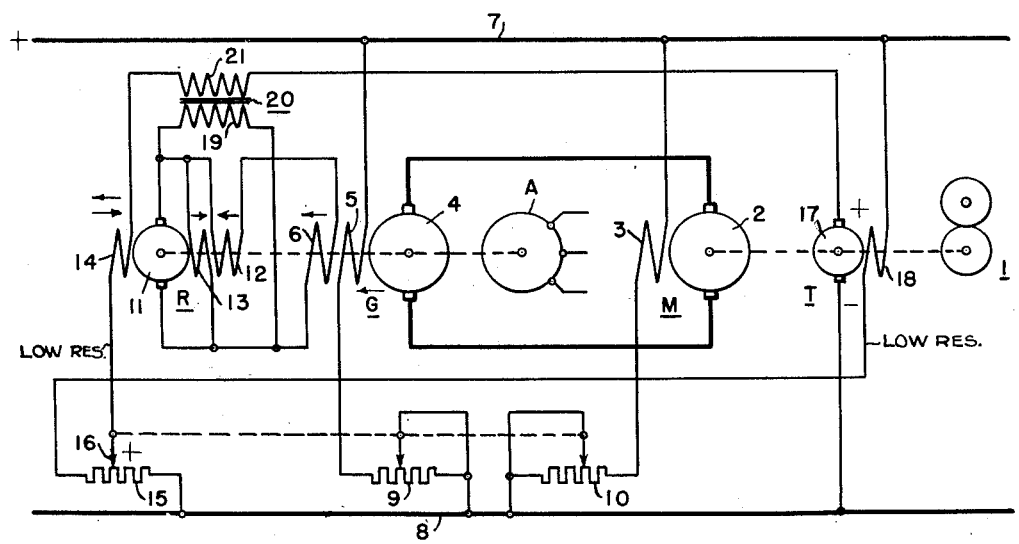
WITNESSES:
INVENTORS
James P. Montgomery
and William T. Hunt, Jr.
BY
ATTORNEY Patented Feb. 24, 1953

2,629,846

UNITED STATES PATENT OFFICE 2,629,846

DRIVE CONTROL SYSTEM

James P. Montgomery, Buffalo, and William T. Hunt, Jr., Williamsville, N. Y., assignors to Westinghouse Electric Corporation, East Pittsburgh, Pa., a corporation of Pennsylvania Application November 18, 1949, Serial No. 128,052

24 Claims. (Cl. 318—146)

Our invention relates to electric drive control systems in which a direct-current motor is energized by controllable and regulated voltage from a generator whose field excitation is varied by an amplifying auxiliary generator in dependence upon the drive speed to maintain the speed at a desired value.

It is an object of the invention to improve such systems toward better accuracy and stability. This object is especially significant for drive systems intended to satisfy most exacting regulating or control requirements, for instance, as expected from a drive unit for paper making machinery where a slight speed variation, due to fluctuations in supply voltage or due to changes in temperature and the like minor irregularities, may detrimentally affect the speed adaptation between the mill sections and thus cause irregularities in the manufactured product. It is, therefore, among the more specific objects of the invention to devise a speed controlled system that will secure a high and constant degree of accuracy regardless of such voltage or temperature variations.

The foregoing and more specific objects of the invention as well as the means provided according to the invention for achieving these objects will be apparent from the following description of the embodiment illustrated in the drawing.

The drawing shows the circuit diagram of a drive unit for a paper mill. The machinery to be driven is schematically represented at 1. It is connected through a suitable transmission with the armature 2 of a direct-current drive motor M whose field winding is denoted by 3. The armature 2 of motor M is energized from the armature 4 of a main generator G having two field windings 5 and 6. The field winding 5 is excited from constant voltage buses 7 and 8 through a field rheostat 9. Field winding 5 supplies very nearly all of the excitation ampere turns needed for the normal operating range of the main generator. The field winding 6 serves to provide a regulating stimulus and hence is rated to provide a lesser member of ampere turns as compared with the main field winding 5. The regulating field winding 6 may be selected to provide as much as 40% of the ampere turns required to produce maximum generator voltage, but will normally operate with much less than that value.

The regulating field winding 6 of main generator G is excited by variable voltage from the armature 11 of an amplifying control generator R which is equipped with three field windings 12, 13 and 14. Generators G and R may be driven by a common auxiliary motor A of substantially constant speed. The field winding 12 is connected in series relation to the armature 11 and the field winding 6. It is rated to provide most, or approximately all, of the excitation needed to maintain the output voltage of the amplifying generator at any desired value within its normal operating range which extends substantially along the initial linear portion of its magnetic characteristic. The field winding 13 is connected directly across the armature 11. Winding 13 serves a corrective purpose. It is preferably poled to oppose the field winding 12 to prevent hunting tendencies. The two field windings 12 and 13 are so selected and adjusted to give practically perfect "tuning," i. e., the resistance characteristic of the complete field circuit of control generator R is substantially coincident with the linear portion of the magnetic characteristic so that the remaining field winding 14 is only called upon to provide the slight control stimulus needed to shift the output voltage toward higher or lower values. This remaining, or control field winding 14 is connected in a circuit which includes two series opposed and mutually balanceable sources of control voltage. One of these sources is represented by a speed control rheostat 15 connected to be energized from buses 7 and 8 and to whose adjustable tap 16 of the control field winding 14 is attached. The selected position of the tap 16 determines the speed at which the drive is supposed to run. The second source of voltage in the circuit of field winding 14 consists in a tachometer generator T.

The armature 17 of this generator is mechanically connected with the armature 2 or with any other part driven by the motor M so that the tachometer output voltage is a measure of the drive speed. The low voltage field winding 18 of tachometer T is connected in series with the control rheostat 15 and normally receives constant excitation from the voltage supply buses 7 and 8. The design of this tachometer generator, for the application we make, is such that it operates on the straight line portion of its saturation curve. Since the field winding 18 is a low voltage winding, most of the voltage drop in the field circuit, including the resistor sections of the rheostat, is across these resistor sections. For our control it is important that the speed control rheostat 15 and the tachometer field winding 18 be connected in series relation to each other. Connected across the armature 11 of control generator R, i. e., in parallel relation to the control field winding 6 of the main generator G, is the primary 19 of a damping transformer 20 whose secondary 21 is series-connected in the circuit of the control field winding 14.

During steady state operation of the drive system, the output voltage of the secondary winding 21 of transformer 20 is zero and the ampere turns of control field winding 14 are also zero because the speed reference voltage from across the effective portion of control rheostat 15 is balanced by the speed responsive voltage across the tachometer armature 17. By putting as much copper as possible into the control field winding 14 and designing this field winding to have a resistance equal to the external resistance looking away from the terminals of that field winding, the maximum amplification is obtained. The highest achievable amplification for given machine sizes is desirable in order to secure the best possible accuracy of regulation. Then, however, the amplification and the time constants of the system are such that additional damping means are required to obtain stable operation. Such a damping effect is produced by the transformer 20 which supplies a damping secondary voltage only during variations in output voltage of control generator R.

The above-described series connection of the tachometer armature 17 and the speed control rheostat 15 in the circuit of control field winding 14, in conjunction with the linear operating characteristic of the tachometer generator and of generator R has the effect of providing compensation for voltage fluctuations of the supply buses and also for temperature changes which result in a change of resistance of the tachometer field winding 18. If the voltage across buses 7 and 8 should decrease slightly, the reference voltage across the tapped off portion of control rheostat 15 would decrease in the same ratio. The excitation of the tachometer generator would also decrease in the same ratio. Consequently, the motor M will continue to run at the same speed as before the voltage change in order to make the tachometer voltage match the reference voltage.

The adjustable tap 16 of the speed control rheostat 15 is preferably actuated by means of an auxiliary reversible motor with push-button control in order to permit a precision adjustment of the speed and to also permit controlling the acceleration and deceleration of the drive. The generator field rheostat 9 is used to adjust the ampere turns in the main field winding 5 to approximately the correct value to produce the required main generator voltage. The motor field rheostat 10 is preferably provided for reducing the field excitation of motor M when part of the speed range is to be obtained by field weakening of the motor. As schematically indicated, the adjustable members of field rheostats 9 and 10 are preferably ganged up with the motor actuated tap 16 of the speed control rheostat 15 to afford an automatic adaptation of the main generator and motor field excitation to changes in the setting of the speed control rheostat.

It may be mentioned that while we consider the above-described type of control and circuit design of the amplifying generator R to be preferable, there are other types of amplifying control generators, such as those involving excitation by armature reaction, which may be used in systems according to the invention. Such and other modifications concerning the design and connection of the circuit elements of the system are available to those skilled in the art without departing from the objects and essential features of our invention and within the scope of the claims annexed hereto.

We claim as our invention:

1. An electric drive control system, comprising a direct-current drive motor and a main generator having a common armature circuit, said generator having a main field winding rated to provide nearly all of the field excitation needed for normal operation and having a control field winding rated to provide a smaller amount of field excitation than said main field winding, voltage supply means connected to said main field winding, an amplifying control generator having throughout its operating range a substantially linear characteristic and having an armature connected across said control field winding to provide it with control voltage, said control generator having a control field winding for varying said control voltage, circuit means of adjustable constant voltage for setting a desired speed, circuit means for providing variable pilot-voltage proportional to the drive speed, said two circuit means being connected in series opposed relation to each other across said control field winding of the control generator.

2. An electric drive control system comprising a direct-current drive motor and a main generator having a common armature circuit, said generator having a main field winding rated to provide nearly all of the field excitation needed for normal operation and having a control field winding rated to provide a smaller amount of field excitation than said main field winding, constant voltage supply means connected to said main field winding, an amplifying control generator having throughout its operating range a substantially linear characteristic and having an armature connected across said control field winding to provide it with control voltage, said control generator having a control field winding for varying said control voltage, a speed control rheostat having a tap point, a tachometer generator having a field winding connected in series with said rheostat to said constant voltage supply means and having an armature mechanically connected with said drive motor and disposed to be electrically connected in series with said control field winding of the control generator and said tap point, said series-connection including a tapped portion of said rheostat in voltage opposed relation to said armature of said tachometer generator.

3. An electric drive control system, comprising a direct-current drive motor and a main generator having a common armature circuit, said main generator having a main field winding rated to supply nearly all the main generator excitation needed for normal operation and having a control field winding, an amplifying generator of substantially linear characteristic having an armature connected across said control field winding to provide it with variable voltage and having a control field winding for controlling said variable voltage, a speed control rheostat having a selective tap point, constant voltage supply means, a tachometer generator having a field winding connected in series with said rheostat to said constant voltage supply means and having an armature mechanically connected with said drive motor and having its armature winding in series-connection with said control field winding of the amplifying generator and said tap point, said series-connection including a tapped portion of said rheostat in voltage opposed relation to said armature of said tachometer generator.

4. An electric drive control system, comprising a direct-current drive motor and a main generator having a common armature circuit, said generator having a main field winding rated to supply nearly all the main generator excitation needed for normal operation and having a control field winding, an amplifying generator of substantially linear characteristic having an armature connected across said control field winding to provide it with variable voltage and having a control field winding for controlling said variable voltage, a transformer having a primary circuit connected parallel to said control field winding of said main generator and having a secondary circuit to provide a voltage dependent upon variation of said variable voltage, a speed control rheostat having a selective tap point, constant voltage supply means, a tachometer generator having a field winding connected in series with said rheostat to said constant voltage supply means and having an armature mechanically connected with said drive motor and having an armature winding in series connection with said control field winding of the amplifying generator and said secondary circuit and said tap point, said series-connection including a tapped portion of said rheostat in voltage opposed relation to said armature of said tachometer generator.

5. In an electric drive control system, in combination, a main motor having an armature winding and a field winding provided with rheostatic control for varying the excitation of the motor to thus change the speed of the motor, a main generator having an armature winding connected in a loop circuit with the armature winding of the main motor, said main generator having a main field winding provided with rheostatic control circuits and being rated to provide nearly all the excitation for the main generator, said main generator also having a control field winding rated to provide a field excitation smaller than the excitation of the main field winding, direct current supply terminals energized by a substantially constant voltage, said field windings and rheostatic controls for the main field winding of the generator and the field winding of the motor being connected to the direct current supply terminals, a tachometer generator driven by the main motor, said tachometer generator having an armature and an armature winding thereon and a field winding, said tachometer generator being designed to produce a voltage proportional to speed, the tachometer generator armature being coupled to operate proportional to motor speed, a resistor, said resistor and tachometer generator field winding being connected in series to said direct current supply terminals, a control generator having a control field winding and a second field comprising a main generator excitation control field and having an armature winding connected in series with the main generator control field winding and the said second field, said tachometer generator armature winding and control field of the control generator being connected in a series circuit with one terminal of said series circuit being connected to one of the direct current supply terminals and the other terminal of said series circuit being connected at any selected point along said resistor, whereby automatic compensation is provided for the control for resistance variations, because of changes in temperature, and changes in voltage at the direct current supply terminals.

6. In an electric drive control system, in combination, a main motor having an armature winding and a field winding provided with rheostatic control for varying the excitation of the motor to thus change the speed of the motor, a main generator having an armature winding connected in a loop circuit with the armature winding of the main motor, and main generator having a main field winding provided with rheostatic control circuits and being rated to provide nearly all the excitation for the main generator, said main generator also having a control field winding rated to provide a field excitation smaller than the excitation of the main field winding, direct current supply terminals energized by a substantially constant voltage, said field windings and rheostatic controls for the main field winding of the generator and the field winding of the motor being connected to the direct current supply terminals, a tachometer generator driven by the main motor, said tachometer generator having an armature and an armature winding thereon and a field winding, said tachometer generator being designed to produce a voltage proportional to speed, the tachometer generator armature being coupled to operate proportional to motor speed, a resistor, said resistor and tachometer generator field winding being connected in series to said direct current supply terminals, a control generator having a control field winding and a second field comprising a main generator excitation-control field and having an armature winding connected in series with the main generator control field winding and the said second field, a transformer primary connected in parallel with the self-exciting field and the main generator control field, a transformer secondary winding, said tachometer generator armature winding transformer secondary winding and control field of the control generator being connected in a series circuit with one terminal of said series circuit being connected to one of the direct current supply terminals and the other terminal of said series circuit being connected at any selected point along said resistor, whereby automatic compensation is provided for the control for resistance variations, because of changes in temperature, and changes in voltage at the direct current supply terminals, and anti-hunt protection is provided for the control.

7. In a system of control including in combination, a motor, a generator connected in a loop circuit with said motor, an amplifying control generator having an armature winding, a field winding in series with the armature winding, and a load unit all connected in a loop circuit, said control generator having a voltage control field winding, a tachometer generator coupled to said motor, said tachometer generator having an armature winding and a field winding, a resistor, a pair of direct current supply terminals, said resistor and tachometer generator field winding being connected in series across said direct current supply terminals, and a voltage control series circuit extending from one supply terminal through the tachometer armature winding, and the voltage control field winding to any selected point along said resistor.

8. In a system of control including in combination, a motor, a main generator connected in a loop circuit with said motor, an amplifying control generator having an armature winding, a field winding, and a load unit all connected in a loop circuit, and having a voltage control field winding, a transformer primary winding interconnected with said series circuit to produce a current surge proportional to the rate of current variation in said series circuit, a transformer secondary winding, a tachometer generator coupled to the motor and having an armature winding and a field winding, a resistor, a pair of direct current supply terminals, said resistor and tachometer generator field winding being connected in series across said direct current supply terminals, and a voltage control series circuit extending from one supply terminal through the tachometer armature winding, the transformer secondary winding, the voltage control field winding to any selected point along said resistor.

9. In a system of control including in combination, a motor, a main generator connected in a loop circuit with said motor, a pair of direct current supply terminals, a control generator having an armature winding and a load circuit therefor, field winding means for exciting the generator, a voltage control field winding for the generator for also exciting the generator, a resistor, a second control generator coupled to said motor and having an armature winding and having a field winding, said field winding for the second generator and resistor being connected in series across said supply terminals, and said armature winding of the second generator and voltage control field winding being connected in a series circuit with one terminal thereof being connected to one terminal of said supply terminals and the other terminal thereof being connected to any selected point along said resistor.

10. In a system of control including in combination, a main generator, a motor connected in a loop circuit with the generator, a pair of direct current supply terminals, a control generator having an armature winding and a load circuit therefor, field winding means for exciting the generator, a voltage control field winding for the generator for also exciting the generator, a transformer primary winding responsive to the current changes in the load circuit, a transformer secondary winding, a resistor, a second control generator coupled to the motor and having an armature winding and having a field winding, said field winding for the second generator and resistor being connected in series across said supply terminals, and said armature winding of the second generator and voltage control field winding, and transformer secondary winding, being connected in a series circuit with one terminal thereof being connected to one terminal of said supply terminals and the other terminal thereof being connected to any selected point along said resistor.

11. An electric control system for maintaining a constant preselected speed of a motor, comprising in combination, an electric motor having an armature winding and a field winding, a main generator having an armature winding connected to the motor armature winding and having main and auxiliary speed control field windings, a pair of buses of constant potential for energizing said main speed control field winding, a regulating generator for energizing the auxiliary field winding, said regulating generator having a pair of field windings which are wound in magnetic opposition with one of the field windings being adjusted to supply by far the major portion of the excitation current and the second field winding being adjusted to provide a stabilization excitation, a third field winding for the regulating generator, a tachometer generator, having an armature winding and a field winding, the tachometer armature being coupled to be driven in proportion to the motor speed, a potentiometer resistor connected in series with the tachometer generator field winding with the potentiometer resistor and tachometer generator field winding being energized at a constant potential, the armature winding of the tachometer generator being connected in a series circuit including a portion of said potentiometer resistor, and the third field winding of the regulating generator.

12. An electric control system for maintaining a constant preselected speed of a motor, comprising in combination, an electric motor having an armature winding and a field winding, a main generator having an armature winding connected to the motor armature winding and having main and auxiliary speed control field windings, a pair of buses of constant potential for energizing said main speed control field winding, a regulating generator for energizing the auxiliary field winding, said regulating generator having a transformer primary winding connected across its armature winding and having a pair of field windings which are wound in magnetic opposition with one of the field windings being adjusted to supply by far the major portion of the excitation current and the second field winding being adjusted to provide a stabilization excitation, a third field winding for the regulating generator, a tachometer generator, having an armature winding and a field winding, the tachometer armature being coupled to be driven in proportion to the motor speed, a potentiometer resistor connected in series with the tachometer generator field winding with the potentiometer resistor and tachometer generator field winding being energized at a constant potential, a transformer secondary winding associated with said primary winding, the armature winding of the tachometer generator being connected in a series circuit including a portion of said potentiometer resistor, the third field winding of the regulating generator, and the transformer secondary winding.

13. An electric control system for maintaining a constant preselected speed of a motor, comprising in combination, an electric motor having an armature winding and a field winding, a main generator having an armature winding connected to the motor armature winding and having main and auxiliary speed control field windings, a pair of buses of constant potential for energizing said main speed control field winding, a regulating generator for energizing the auxiliary field winding, said regulating generator having a pair of field windings which are wound in magnetic opposition with one of the field windings being adjusted to supply by far the major portion of the excitation current and the second field winding being adjusted to provide a stabilization excitation, a third field winding for the regulating generator, a tachometer generator, having an armature winding and a field winding, the tachometer armature being coupled to be driven in proportion to the motor speed, a potentiometer resistor connected in series with the tachometer generator field winding with the potentiometer resistor and tachometer generator field winding being energized at a constant potential, the armature winding of the tachometer generator being connected in a series circuit including a portion of said potentiometer resistor, and the third field winding of the regulating generator, the connection of the tachometer generator to the potentiometer resistor being so made that the voltage drop across said portion of the potentiometer resistor is in voltage opposition to the voltage of the tachometer resistor.

14. An electric control system for maintaining a constant preselected speed of a motor, comprising in combination, an electric motor having an armature winding and a field winding, a main generator having an armature winding connected to the motor armature winding and having main and auxiliary speed control field windings, a pair of buses of constant potential for energizing said main speed control field winding, a regulating generator for energizing the auxiliary field winding, said regulating generator having a transformer primary winding connected across its armature winding and having a pair of field windings which are wound in magnetic opposition with one of the field windings being adjusted to supply by far the major portion of the excitation current and the second field winding being adjusted to provide a stabilization excitation, a third field winding for the regulating generator, a tachometer generator, having an armature winding and a field winding, the tachometer armature being coupled to be driven in proportion to the motor speed, a potentiometer resistor connected in series with the tachometer generator field winding with the potentiometer resistor and tachometer generator field winding being energized at a constant potential, a transformer secondary winding associated with said primary winding, the armature winding of the tachometer generator being connected in a series circuit including a portion of said potentiometer resistor, the third field winding of the regulating generator and the transformer secondary winding, the connection of the tachometer generator to the potentiometer resistor being so made that the voltage drop across said portion of the potentiometer resistor is in voltage opposition to the voltage of the tachometer resistor.

15. A speed control system for maintaining constant motor speed, comprising, in combination, an electric motor, a plurality of supply terminals connected to a suitable source of constant direct current potential, a generator having its armature connected in a loop circuit with the motor armature, main and auxiliary field windings for said generator for controlling the speed of said motor, voltage generating means for producing a voltage proportional to motor speed, a resistor having a plurality of sections, said voltage generating means having a field winding connected in series with the said resistor and to a pair of said supply terminals to thus effect energization of said last named field winding at a substantially constant value, a regulating generator having three field windings, the first of which is connected in series with the generator auxiliary field winding and the armature of the regulating generator, the second of which is connected across the armature of the regulating generator, and the third is connected in series with a selected portion of the resistor and the said voltage generating means, with the voltage drop of the resistor being in voltage opposition to the voltage regulating means.

16. A speed control system for maintaining constant motor speed, comprising, in combination, an electric motor, a plurality of supply terminals connected to a suitable source of constant direct current potential, a generator having its armature connected in a loop circuit with the motor armature, main and auxiliary field windings for said generator for controlling the speed of said motor, voltage generating means for producing a voltage proportional to motor speed, a resistor having a plurality of sections, said voltage generating means having a field winding connected in series with the said resistor and to a pair of said supply terminals, to thus effect energization of said last named field winding at a substantially constant value, a regulating generator having three field windings, the first of which is connected in series with the generator auxiliary field winding and the armature of the regulating generator, the second of which is connected across the armature of the regulating generator, and the third is connected in series with a selected portion of the resistor and the said voltage generating means, with the voltage drop of the resistor being in voltage opposition to the voltage regulating means, and means for simultaneously changing the excitation of the main field winding of the generator and the number of resistor sections of said resistor in series with the voltage generating means.

17. In an electric speed-control system for maintaining constant motor speed of a motor connected in a Ward-Leonard type circuit, in combination, an electric motor having an armature winding and a field winding; a main generator having an armature winding connected in a loop circuit with the motor armature winding and having a main field winding supplying the major portion of the main generator excitation and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third, or control, field winding, a tachometer generator having an armature coupled to be driven in proportion to the motor speed and having a field winding, constant voltage supply terminals for energizing the main field winding of the main generator, the field winding of the motor, and the field winding of the tachometer generator, a potentiometer resistor connected in series with the tachometer field winding, said tachometer armature being connected in a loop circuit including a supply terminal having the same polarity as the tachometer armature, the tachometer armature, the said third field winding of the regulating generator, to a selected point on the potentiometer resistor to thus include a selected portion of the potentiometer resistor, back to said supply terminal having the same polarity as the armature of the tachometer generator to which it is connected.

18. In an electric speed-control system for maintaining constant motor speed of a motor connected in a Ward-Leonard type circuit, in combination, an electric motor having an armature winding, a field winding, and a rheostat in series with the motor field winding for changing the excitation of the motor field winding; a main generator having an armature winding connected in a loop circuit with the motor armature, having a main field winding supplying the major portion of the main generator excitation, and having a rheostat connected in series with the main field winding and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third, or control, field winding, a tachometer generator having an armature coupled to be driven in proportion to the motor speed and having a field winding, constant voltage supply terminals for energizing the main field winding of the main generator, the field winding of the motor, and the field winding of the tachometer generator, a potentiometer resistor connected in series with the tachometer field winding, said tachometer armature being connected in a loop circuit including a supply terminal having the same polarity as the tachometer armature, the tachometer armature, the said third field winding of the regulating generator, to a selected point on the potentiometer resistor to thus include a selected portion of the potentiometer resistor, back to said supply terminal having the same polarity as the armature of the tachometer generator to which it is connected, and means for simultaneously operating the said rheostats and potentiometer resistor to effect motor speed changes and recalibration of the output of the tachometer generator for such changes in motor speed.

19. In an electric speed-control system for maintaining constant motor speed of a motor connected in a Ward-Leonard type circuit, in combination, an electric motor having an armature winding and a field winding; a main generator having an armature winding connected in a loop circuit with the motor armature winding and having a main field winding supplying the major portion of the main generator excitation and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third or control, field winding, a tachometer generator having an armature coupled to be driven in proportion to the motor speed and having a field winding, constant voltage supply terminals for energizing the main field winding of the main generator, the field winding of the motor, and the field winding of the tachometer generator, a potentiometer resistor connected in series with the tachometer field winding, a transformer having a primary winding and a secondary winding, said tachometer armature being connected in a loop circuit including a supply terminal having the same polarity as the tachometer armature, the tachometer armature, the secondary winding of the transformer, the said third field winding of the regulating generator, to a selected point on the potentiometer resistor to thus include a selected portion of the potentiometer resistor, back to said supply terminal having the same polarity as the armature of the tachometer generator to which it is connected, said transformer primary winding being connected across the armature terminals of the regulating generator.

20. In an electric speed-control system for maintaining constant motor speed of a motor connected in a Ward-Leonard type circuit, in combination, an electric motor having an armature winding and a field winding; a main generator having an armature winding connected in a loop circuit with the motor armature winding and having a main field winding supplying the major portion of the main generator excitation and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third, or control, field winding, said third winding being selected to have a low resistance value, a tachometer generator having an armature coupled to be driven in proportion to the motor speed and having a field winding, said field winding of the tachometer generator being selected to have a low resistance value, constant voltage supply terminals for energizing the main field winding of the main generator, the field winding of the motor, and the field winding of the tachometer generator, a potentiometer resistor connected in series with the tachometer field winding, said tachometer armature being connected in a loop circuit including a supply terminal having the same polarity as the tachometer armature, the tachometer armature, the said third field winding of the regulating generator, to a selected point on the potentiometer resistor to thus include a selected portion of the potentiometer resistor, back to said supply terminal having the same polarity as the armature of the tachometer generator to which it is connected.

21. In an electric speed-control system for maintaining constant motor speed of a motor connected in a Ward-Leonard type circuit, in combination, an electric motor having an armature winding, a field winding, and a rheostat in series with the motor field winding for changing the excitation of the motor field winding; a main generator having an armature winding connected in a loop circuit with the motor armature winding, having a main field winding supplying the major portion of the main generator excitation, and having a rheostat connected in series with the main field winding and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third, or control, field winding, a tachometer generator having an armature coupled to be driven in proportion to the motor speed and having a field winding, constant voltage supply terminals for energizing the main field winding of the main generator, the field winding of the motor, and the field winding of the tachometer generator, a potentiometer resistor connected in series with the tachometer field winding, a transformer having a primary winding and a secondary winding, said tachometer armature being connected in a loop circuit including a supply terminal having the same polarity as the tachometer armature, the tachometer armature, the secondary winding of the transformer, the said third field winding of the regulating generator, to a selected point on the potentiometer resistor to thus include a selected portion of the potentiometer resistor, back to said supply terminal having the same polarity as the armature of the tachometer generator to which it is connected, said transformer primary winding being connected across the armature terminals of the regulating generator, and means for simultaneously operating the said rheostats and potentiometer resistor to effect motor speed changes and recalibration of the output of the tachometer generator for such changes in motor speed.

22. In an electric speed-control system for maintaining constant motor speed of a motor connected in a Ward-Leonard type circuit, in combination, an electric motor having an armature winding, a field winding, and a rheostat in series with the motor field winding for changing the excitation of the motor field winding, a main generator having an armature winding connected in a loop circuit with the motor armature winding, having a main field winding supplying the major portion of the main generator excitation, and having a rheostat connected in series with the main field winding and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third, or control, field winding, said third winding being selected to have a low resistance value, a tachometer generator having an armature coupled to be driven in proportion to the motor speed and having a field winding, said field winding of the tachometer generator being selected to have a low resistance value, constant voltage supply terminals for energizing the main field winding of the main generator, the field winding of the motor, and the field winding of the tachometer generator, a potentiometer resistor connected in series with the tachometer field winding, said tachometer armature being connected in a loop circuit including a supply terminal having the same polarity as the tachometer armature, the tachometer armature, the said third field winding of the regulating generator, to a selected point on the potentiometer resistor to thus include a selected portion of the potentiometer resistor, back to said supply terminal having the same polarity as the armature of the tachometer generator to which it is connected, and means for simultaneously operating the said rheostats and potentiometer resistor to effect motor speed changes and recalibration of the output of the tachometer generator for such changes in motor speed.

23. In an electric speed-control system for maintaining constant motor speed of a motor connected in a Ward-Leonard type circuit, in combination, an electric motor having an armature winding and a field winding; a main generator having an armature winding connected in a loop circuit with the motor armature winding and having a main field winding supplying the major portion of the main generator excitation and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third, or control, field winding, said third winding being selected to have a low resistance value, a tachometer generator having an armature coupled to be driven in proportion to the motor speed and having a field winding, said field winding of the tachometer generator being selected to have a low resistance value, constant voltage supply terminals for energizing the main field winding of the main generator, the field winding of the motor, and the field winding of the tachometer generator, a potentiometer resistor connected in series with the tachometer field winding, a transformer having a primary winding and a secondary winding, said tachometer armature being connected in a loop circuit including a supply terminal having the same polarity as the tachometer armature, the tachometer armature, the secondary winding of the transformer, the said third field winding of the regulating generator, to a selected point on the potentiometer resistor to thus include a selected portion of the potentiometer resistor, back to said supply terminal having the same polarity as the armature of the tachometer generator to which it is connected, said transformer primary winding being connected across the armature terminals of the regulating generator.

24. In an electric speed-control system for maintaining constant motor speed of a motor connected in a Ward-Leonard type circuit, in combination, an electric motor having an armature winding, a field winding, and a rheostat in series with the motor field winding for changing the excitation of the motor field winding; a main generator having an armature winding connected in a loop circuit with the motor armature winding, having a main field winding supplying the major portion of the main generator excitation, and having a rheostat connected in series with the main field winding and having an auxiliary voltage control field winding; a regulating generator having an armature winding and a series field winding connected in a loop circuit with the auxiliary field winding of the main generator, having a stabilizing field winding connected across the armature terminals of the regulating generator, and having a third, or control, field winding, said third winding being selected to have a low resistance value, a tachometer generator having an armature coupled to be driven in proportion to the motor speed and having a field winding, said field winding of the tachometer generator being selected to have a low resistance value, constant voltage supply terminals for energizing the main field winding of the main generator, the field winding of the motor, and the field winding of the tachometer generator, a potentiometer resistor connected in series with the tachometer field winding, a transformer having a primary winding and a secondary winding, said tachometer armature being connected in a loop circuit including a supply terminal having the same polarity as the tachometer armature, the tachometer armature, the secondary winding of the transformer, the said third field winding of the regulating generator, to a selected point on the potentiometer resistor to thus include a selected portion of the potentiometer resistor, back to said supply terminal having the same polarity as the armature of the tachometer generator to which it is connected, said transformer being connected across the armature terminals of the regulating generator, and means for simultaneously operating the said rheostats and potentiometer resistor to effect motor speed changes and recalibration of the output of the tachometer generator for such changes in motor speed.

JAMES P. MONTGOMERY.
WILLIAM T. HUNT, Jr.

REFERENCES CITED

The following references are of record in the file of this patent:

UNITED STATES PATENTS

| Number | Name | Date |
|---|---|---|
| 1,048,548 | Kramer | Dec. 31, 1912 |
| 2,247,166 | Edwards et al. | June 24, 1941 |
| 2,295,395 | Formhals | Sept. 8, 1942 |
| 2,412,888 | Ivy | Dec. 17, 1946 |
| 2,519,339 | Avery | Aug. 22, 1950 |